United States Patent [19]
Orii et al.

[11] Patent Number: 5,528,096
[45] Date of Patent: Jun. 18, 1996

[54] SMALL BRUSH-USE DC MOTOR

[75] Inventors: Makoto Orii; Katsuhiko Hayashi, both of Nagano, Japan

[73] Assignee: Kabushiki Kaisha Sankyo Seiki Seisakusho, Nagano, Japan

[21] Appl. No.: 190,588

[22] Filed: Feb. 2, 1994

Related U.S. Application Data

[63] Continuation-in-part of Ser. No. 143,581, Oct. 29, 1993, abandoned.

[30] Foreign Application Priority Data

| Oct. 29, 1992 | [JP] | Japan | 4-291431 |
| Nov. 12, 1992 | [JP] | Japan | 4-302382 |
| Nov. 25, 1992 | [JP] | Japan | 4-081148 U |

[51] Int. Cl.$^6$ .......................... H02K 13/00; H02K 13/12; H02K 7/08; G10F 1/06
[52] U.S. Cl. .................... 310/237; 310/40 MM; 310/90; 84/95.2
[58] Field of Search .................... 310/40 MM, 90, 310/83, 235, 237; 84/94.1, 94.2, 95.1, 95.2, 96, 97

[56] References Cited

U.S. PATENT DOCUMENTS

| 446,684 | 2/1891 | Hussey | 84/95.1 |
| 2,489,149 | 11/1949 | Makowski | 84/95.1 |
| 2,741,713 | 4/1956 | Rowley | 310/83 |
| 2,987,638 | 6/1961 | Lux | 310/90 |
| 3,915,365 | 10/1975 | Lace | 310/83 |
| 4,088,914 | 5/1978 | Aoki | 310/90 |
| 4,727,358 | 2/1988 | Burt, III | 84/95.2 |
| 4,769,566 | 9/1988 | Matsuda | 310/40 MM |
| 5,089,736 | 2/1992 | Oyafuso | 310/60 |
| 5,287,032 | 2/1994 | Zolda | 310/233 |

FOREIGN PATENT DOCUMENTS

| 1470324 | 2/1968 | France . | |
| 2392515 | 12/1978 | France . | |
| 15150 | 9/1956 | Germany | 310/235 |
| 1622882 | 2/1971 | Germany . | |
| 3911592 | 10/1990 | Germany . | |
| 4110971 | 10/1992 | Germany . | |
| 64-54754 | 4/1989 | Japan . | |
| 121357 | 6/1989 | Japan . | |
| 297876 | 6/1954 | Switzerland | 84/95.1 |
| 310524 | 12/1955 | Switzerland | 84/95.2 |
| 313790 | 6/1956 | Switzerland . | |
| 325132 | 12/1957 | Switzerland | 84/95.1 |
| 1330680 | 8/1987 | U.S.S.R. . | |
| 17527 | 9/1904 | United Kingdom | 310/237 |
| 777664 | 6/1957 | United Kingdom . | |

OTHER PUBLICATIONS

Database WPI, Section EI, Week 8811, Aug. 15, 1987, Derwent Publications Ltd., London, GB.

*Primary Examiner*—Clayton E. La Balle
*Attorney, Agent, or Firm*—Sughrue, Mion, Zinn, Macpeak & Seas

[57] ABSTRACT

A small brush-use DC motor includes a stator member including a first stator case in which a magnet is disposed; a rotor member including a rotor core on which a coil is wound, a magnetic center of the rotor core being staggered with respect to the magnetic center of the magnet; a commutator unit having a commutator on a conical portion thereof, the commutator rotating together with the rotor member; and brushes held by a second stator case in such a manner that the brushes are brought into contact with the commutator under a predetermined pressure.

21 Claims, 10 Drawing Sheets

SMALL BRUSH-USE DC MOTOR

This is a Continuation-in-Part of application Ser. No. 08/143,581 filed Oct. 29, 1993 now abandoned.

BACKGROUND OF THE INVENTION

1. Field of the Invention

The present invention relates to a small brush-use DC motor.

2. Related Art

A conventional small brush-use DC motor is disclosed in Unexamined Japanese Utility Model Publication No. Sho. 64-54754, for example. The DC motor is constructed as shown in FIG. 14.

In FIG. 14, reference numeral 71 designates a stator case 71, shaped like a cup. The stator case 71 has a tubular portion 71b in the central part of the bottom thereof. The tubular portion 71b passes through the bottom of the stator case 71.

A first bearing 80 is fitted into and fixed to the tubular portion 71b. A side plate 73 is pressed to or press fitted to the open end (the top side thereof in the drawing) of the stator case 71. A brush holder 74 is fastened on the inner side of the side plate 73 by means of screws or resin molding.

A cap-like portion 74a is protruded upward (toward the side plate 73) in the central part of the brush holder 74. A second bearing 81 is fit into and fixed to the tubular portion 74a.

The first and second bearings 80 and 81 cooperate to rotatably support a rotary shaft 82 of an armature 76.

An armature core 84 with a winding 83 thereon and a commutator unit 85, both being fit to the rotary shaft 82, make up the armature 76. A ring-like magnet 72 is disposed in opposition to the peripheral outer surface of the armature core 84, with a predetermined gap therebetween. The ring-like magnet 72 is fastened to the peripheral inner surface of the cup-like stator case 71.

A contact part 75b, which is formed at the distal end of the brush 75, comes in contact with the peripheral surface of the commutator unit 85 in a slidable fashion. The base of the brush 75 is fastened to the brush holder 74. The brush 75 has a terminal 75a with a hole, not shown. The hole of the terminal 75a is fit into the tubular portion of the brush holder 74, and positioned at the location where the hole of the terminal is fitted and the tubular portion 74a is thermally deformed and welded.

A window hole 71a is formed in the stator case 71. The terminal 75a of the brush 75 passes through the window hole 71a to exterior. A collar 86 is fit to the lower part of the rotary shaft 82, which is located below the armature core 84.

The terminal 75a of the brush 75 is connected to a power source, not shown. The commutator unit 85, which is brought into press contact with the contact part 75b of the brush 75, is mounted thereon. The small DC motor is driven to rotate by changing the direction and phase of a current fed from the brush 75.

In the DC motor thus constructed, a clearance is present between the rotary shaft and the first and second bearings. The clearance possibly allows the related part, or the rotary shaft, to move in the radial direction. When the motor is driven, the play of the related part will create motor noise.

An attempt to reduce the play is one of the ways to reduce the motor noise. However, this attempt creates another problem. That is, when the play is reduced, the rotary shaft comes in area contact with the first and second bearings. The rotation resistance of the rotary shaft when it rotates being supported by the first and second bearings increases.

The small brush-use DC motor of the type in which the tubular-shaped commutator unit is used, generates low noise and has good motor performance. However, this type motor is disadvantageous in that because of the tubular shape of the commutator unit, the tubular commutator unit occupies a larger space expanding in the longitudinal direction.

In this type of the DC motor, the brush-to-brush spatial distance is narrower than the width (diameter) of the commutator unit. For this reason, in assembling the motor, the commutator unit must be inserted in the narrow brush-to-brush space. This makes the assembling work difficult.

A small brush-use DC motor of the type in which the commutator unit is of the disk type, is also known. This type of the DC motor, unlike the DC motor using the tubular commutator, is free of the difficulty of the assembling work, but it is disadvantageous in that the disk-like commutator unit occupies a larger space expanding in the radial direction than the tubular commutator unit.

In the motor-driven music box disclosed in Examined Japanese Utility Model Publication No. Hei. 1-21357, the rotary drum, the vibrating plates, the reduction gear train, and the DC motor are supported by a frame as the base board of the music box.

The gears of the reduction gear train are rotatably supported in a manner that the axes of the gears are inserted into indentations or bearings. The DC motor is laterally mounted on the frame such that the rotor shaft is in parallel with the frame, and the base plate of the motor is fastened to the frame by means of screws.

As described above, to mount the DC motor on the frame, the motor base plate must be fastened to the frame by means of screws, while to assemble the reduction gears into the frame since, the gears are merely put down into the indentations or bearings. In this respect, the DC motor mounting work is more difficult than the gear assembling work.

SUMMARY OF THE INVENTION

Accordingly, an object of the present invention is to provide a motor which succeeds in removing a play of the rotary shaft with respect to the first and second bearings, in reducing the motor noise, and in providing an easy assembling.

According to one aspect of the present invention, there is provided A small brush-use DC motor comprising: a stator member including a first stator case in which a magnet is disposed; a rotor member including a rotor core on which a coil is wound, a magnetic center of the rotor core being staggered with respect to the magnetic center of the magnet; a commutator unit having a commutator on a conical portion thereof, the commutator rotating together with the rotor member; and brushes held by a second stator case in such a manner that the brushes are brought into contact with the commutator under a predetermined pressure.

According to another aspect of the present invention, there is provided a music device comprising: a rotary drum having a plurality of pins arranged in the surface thereof in accordance with a music piece; a plurality of vibrating plates sounded by the pins of the rotary drum; a small brush-use DC motor for driving the rotary drum through a reduction gear train; and a frame for supporting the rotary drum, the vibrating plates, the reduction gear train, and the small brush-use DC motor, the small brush-use DC motor being supported by the frame in such a manner that a shaft for supporting a rotor member of the small brush-use DC motor and a commutator unit is orthogonal to the frame to support the small brush-use DC motor.

According to the present invention, in the brush-use DC motor, the clearance between the shaft and the bearing is reduced to a minimum. And those contact with each other linearly. The armature can be turned smoothly, and the motor noise is reduced.

With the conical shape of the commutator, the space of the motor assembly can be reduced in the axial direction when compared with the conventional one. The result is to reduce noise, to be flattened in shape, and to provide an easy assembling work.

According to the present invention, the music boxes employ the small brush-use DC motors of the first to third embodiments. Those DC motors as the drive sources for the rotary drums are each mounted on the frame as referred to in the fourth embodiment. The shafts of the DC motors are disposed orthogonal to the frames. Therefore, the DC motors can be readily assembled by merely putting the shafts into the bearing indentations of the frames. Therefore, there is eliminated the conventional complicated assembling work of fastening the motor base plate to the frame by means of screws. This facilitates the automatic assembling work of music boxes.

DETAILED DESCRIPTION OF THE PREFERRED EMBODIMENTS

A first embodiment of the present invention will be described.

Figure 1:
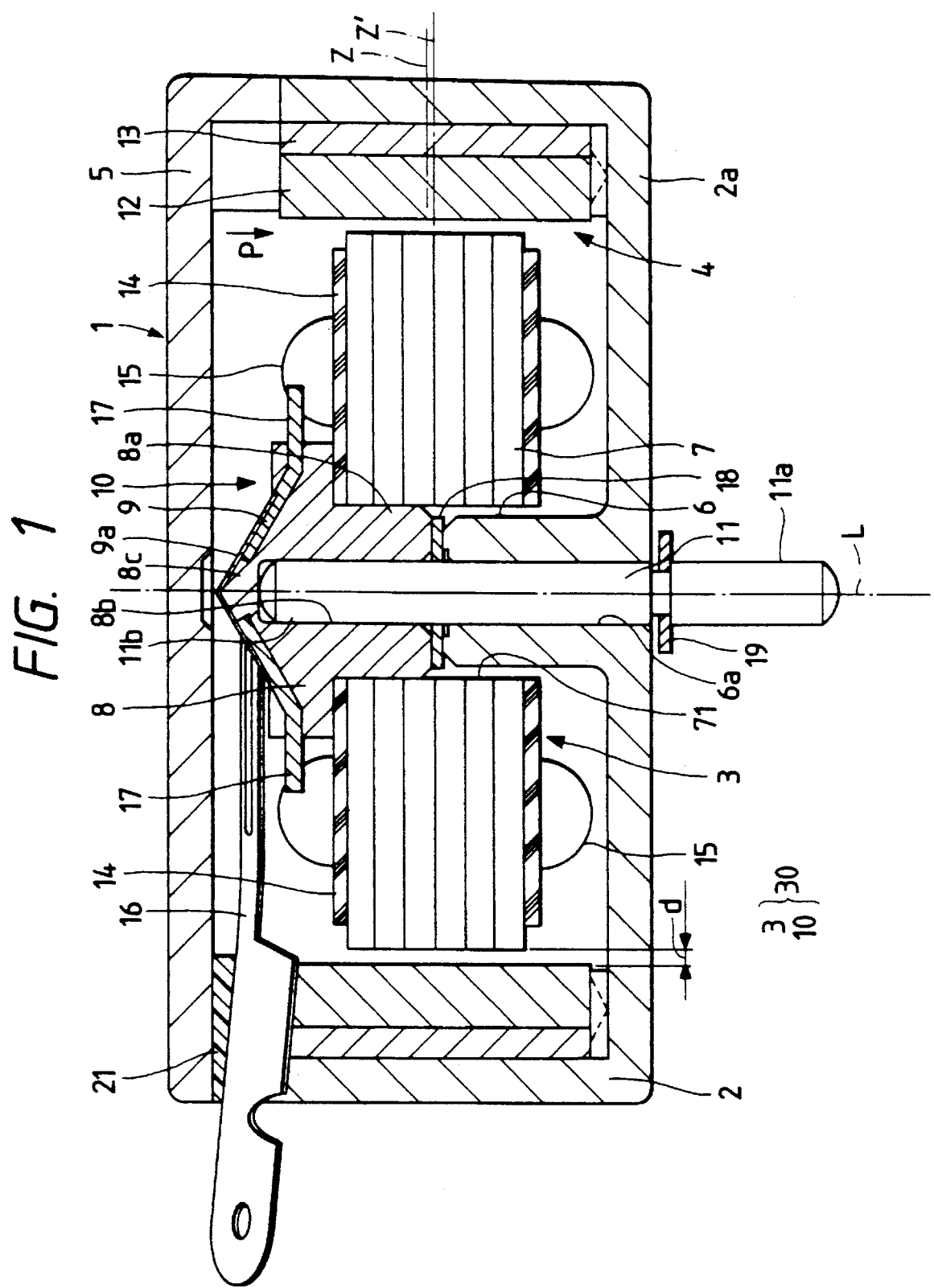
FIG. 1 is a sectional side elevation view of a small brush-use DC motor.

In FIG. 1, reference numeral 1 designates a small DC motor 1 with the brush. As shown, an armature 30 and a stator section 4 are contained in a first stator case 2 of the DC motor 1. A cover 5 as a second stator case is placed on the stator case 2 containing those components for concealing them.

The armature 30 is constructed such that a rotor section 3 and a commutator unit 10 are mounted on a rotary shaft 11.

Figure 2:
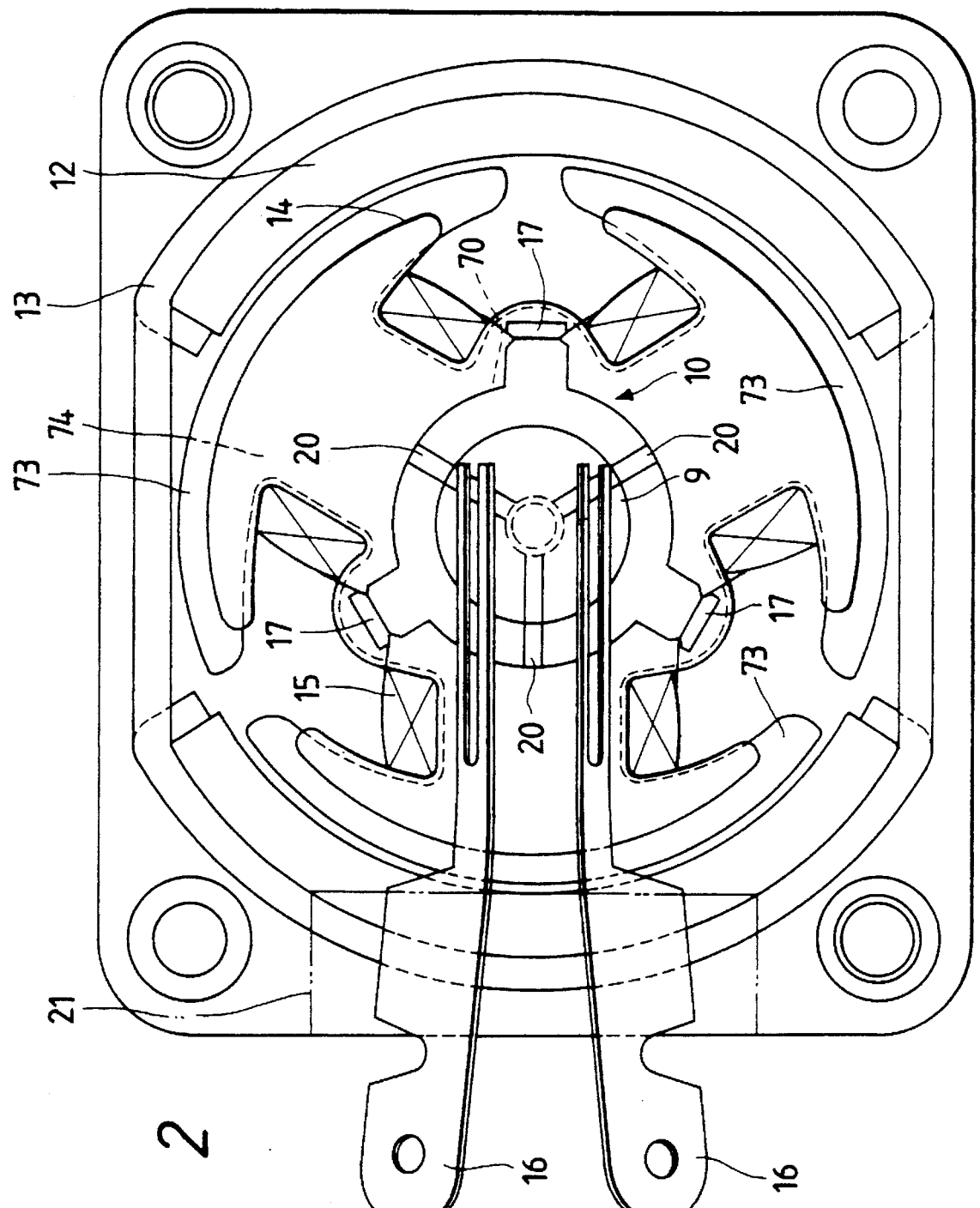
FIG. 2 is a plan view showing the DC motor of FIG. 1.
Figure 3:
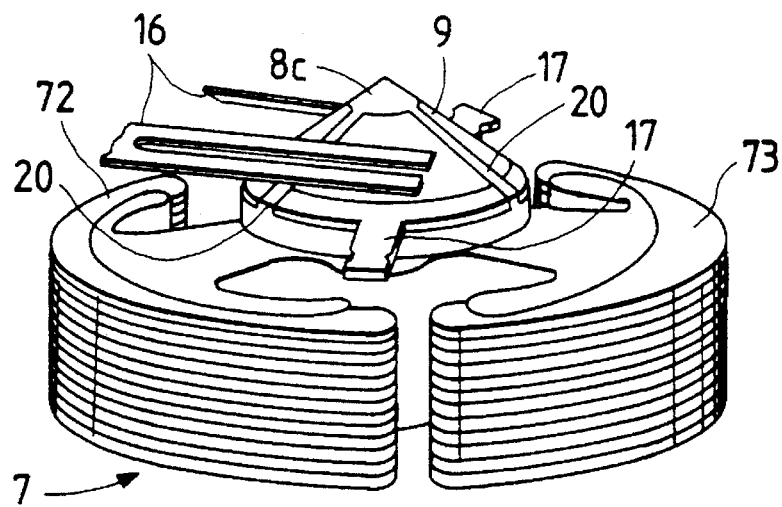
FIG. 3 is a perspective view showing an armature, which is essential to the present invention.

The rotor section 3 includes a rotor core 7, an insulating layer 14 and a winding 15. A plurality of silicone steel plates with excellent magnetic characteristics are laminated into the rotor core 7. As shown in FIGS. 2 and 3, a ring-like member 70 is centered in the rotor core 7. A center hole 71 is formed in the central part of the ring-like member 70. A plural number of poles 72 extend radially from the ring-like member 70.

In the first embodiment, the three poles 72 radially extend in the three directions, as shown in FIGS. 2 and 3. As a matter of course, the number of poles 72 are not limited to three.

Each pole 72 includes an arcuately outward curved, umbrella part 73, and a rib 74 which is narrower than the umbrella part 73 and extends between the side plate 73 and the ring-like member 70. A predetemined number of turns of windings 15 are wound on each rib 74 with an insulating layer 14 being interposed between them. The insulating layer 14 is provided in order to prevent the turns of the winding from shorting through the rotor core 7. If the winding shorts, the motor fails to operate (or it cannot be driven).

The commutator unit 10 includes a commutator holder 8 and a commutator 9. A bearing portion 6 is raised upwardly from the central part of the bottom 2a of the first stator case 2. The rotary shaft 11 is rotatably inserted in a hole 6a of the bearing portion 6 in such a manner that the free end 11a of the rotary shaft 11 is extended outside the stator case 2, from the bearing hole 6a. A boss 8a of the commutator holder 8, which supports the commutator 9, is fit into the center hole 71 of the ring-like member 70 of the rotor core 7.

A washer 18 is inserted between the bottom surface of the boss 8a and the top surface of the bearing portion 6. The base end 11b of the rotary shaft 11 is press fit into a hole 8b with the bottom of the boss 8a. With this, the commutator holder 8 and the rotary shaft 11 are coupled into a one-piece construction. The commutator holder and the rotary shaft 11 are integrally rotated together with.

The commutator holder 8 includes a conical part 8c, as shown in FIGS. 1 and 3. The commutator 9, which consists of conical members of which the vertices lie on the axial line of the rotary shaft 11, is formed on the conical part 8c of the commutator holder 8 by insert molding.

The commutator 9, which is for changing the direction of the current flowing through the winding 15, consists of three segments separated by grooves 20 which are formed by a suitable cutting means, not shown, such as a cutter.

A pair of brushes 16 are brought into contact with the surface 9a of the commutator 9. The paired brushes 16 are held by a holder member 21, which is fixed to the inner side of the cover 5, and are connected to a power source, not shown.

The paired brushes 16, which feed current from the power source to the commutator 9, are set to the holder member 21 at the same inclination as that of the conical surface 9a of the commutator 9 by the insert molding. Accordingly, when the cover 5 is mounted on the first stator case 2, the paired brushes 16 come in contact with the commutator 9 while applying a present pressure on the commutator 9.

Three electrode terminals 17, which extend radially from the commutator holder 8 in three directions, are arranged around the commutator 9. Each of the terminals 17 is connected to the winding 15, which consists of the predetermined number turns of wires on the rotor core 7.

Arcuate magnets 12 are disposed around the rotor core 7. Each magnet 12 is fastened to the first stator case 2 while a yoke 13 as a part of the stator section 4 is interposed therebetween.

The stator section 4 includes the yokes 13 fastened to the stator case 2 and the magnet 12. The stator section 4 is disposed coaxial with the rotary shaft 11 in a state that the magnet 12 is separated from the rotor core 7 by a predetermined air gap d.

The center plane Z of the rotor section 3 as viewed in the direction of the axis of rotation is staggered with respect to the magnetic center plane Z' of the magnet 12 as viewed also in the direction of the axis of rotation, as shown in FIG. 1. In the illustration of FIG. 1, the magnetic center plane Z' is lower than the center plane Z. At the magnetic center plane Z', the maximum gap magnetic flux density is produced.

With this arrangement, the rotor core 7 is constantly biased toward the magnetic center plane Z', i.e., in the direction P of an arrow, by a magnetic force attraction by the magnets 12. As a result, a clearance between the rotary shaft 11 and the bearing portion 6 is minimized, allowing a smooth rotation of the motor and hence reducing motor noise.

On the other hand, the magnetic attraction force of the magnet 12 is effected to the rotor section 3 so that the rotor 3 rotates in such a manner that the rotor 3 is brought into contact with the washer 18 in the direction of the arrow P toward the first stator case 2. The washer 18 is employed for suppressing the commutator unit.

Reference numeral 19 designates a snap ring 19. The operation of the brush-use DC motor thus constructed will be described.

Upon power on, current flows through a pair of brushes 16, the commutator 9 into the winding 15. As a result, the rotor core 7 is magnetized. At this time, the direction and phase of the flowing current are switched by the commutator 9, so that the polarities of the magnetic poles formed vary. The rotor section 3 repels the magnetic field developed by the magnet 12 thereby to turn. With the turn of the rotor section 3, the rotary shaft 11 rotates.

In the DC motor, the conical commutator 9 whose vertex lies on the axial line of the rotary shaft 11 is disposed on the conical part 8c of the commutator holder 8. The hole 8b with the bottom, which supports the rotary shaft 11, is formed in the boss 8a of the commutator holder 8. This construction reduces the axially extending space occupied by the commutator 9, so that the DC motor 1 can be flattened.

It is noted here that because of the conical shape of the commutator 9, the angle of relief of the cutter can be reduced when the grooves 20 are formed in the surface 9a by the cutter, and further the radial extension of the commutator 9 can be reduced. The result is to reduce the peripheral speed of the commutator 9 and to secure the contact area of the brushes 16 and the commutator 9.

In the conventional DC motor of this type, the commutator unit is shaped tubular or like a disk, and the surface of the commutator unit is divided into segments corresponding to the number of poles by grooving the surface by means of a cutter.

If the commutator unit has three poles, the surface of the commutator unit is grooved at locations angularly separated by 120° by means of a cutter.

If the commutator unit is shaped tubular, the cutter or the commutator unit is moved for forming grooves. Accordingly, the groove forming work can be smoothly carried out. To form grooves in the disk-like commutator unit, the relief for the cutting edge of the cutter must be formed at the central part of the commutator unit since the cutting edge is circular. This limits the reduction of the radial size of the commutator unit. Attempt to make the contact area of the brushes equal in size to the commutator unit results in increase of the radial size. Accordingly, the peripheral speed of the commutator unit increases, causing noise.

In the DC motor of the first embodiment, the brushes 16 are previously fastened to the holder member 21 of the cover 5. In assembling the motor, the brush 16 and the commutator 9 are mutually positioned as intended by merely fixing first the rotor section 3 and then the cover 5 to the stator case 2. In this respect, the assembling work of the motor is improved.

SECOND EMBODIMENT

The second embodiment of the present invention will be described.

In the description of the second embodiment, like reference numerals will designate like or equivalent portions in the first embodiment.

Figure 4:
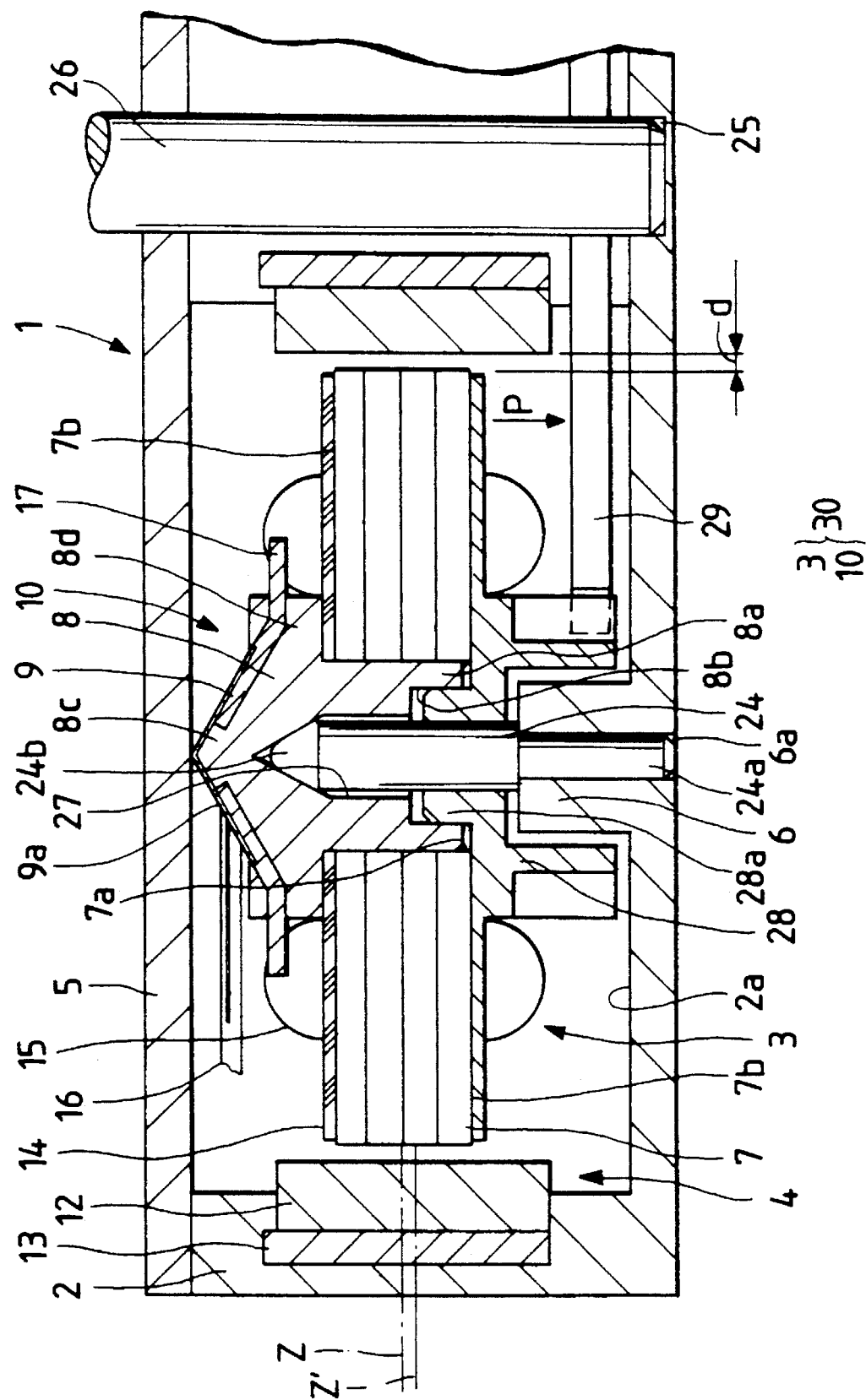
FIG. 4 is a sectional side elevation view of a small brush-use DC motor according to a second embodiment of the present invention.

While the rotary shaft 11 rotates together with the armature 30 in the first embodiment, a shaft 24 is fixed in a small brush-use DC motor 1 of the second embodiment, as shown in FIG. 4.

The second embodiment improves the support structure of the armature 30 of the DC motor 1, more specifically the structure including the support shaft for rotatably supporting the armature 30, and the bearings.

As shown, the armature 30 and a stator section 4 are contained in a first stator case 2 of the DC motor 1 of the second embodiment. A cover 5 as a second stator case is placed on the stator case 2 containing those components for concealing them. As shown, a bearing portion 6 is raised upwardly from the bottom 2a of the first stator case 2 and a thrust bearing 25 is formed in the stator case 2.

Figure 5:
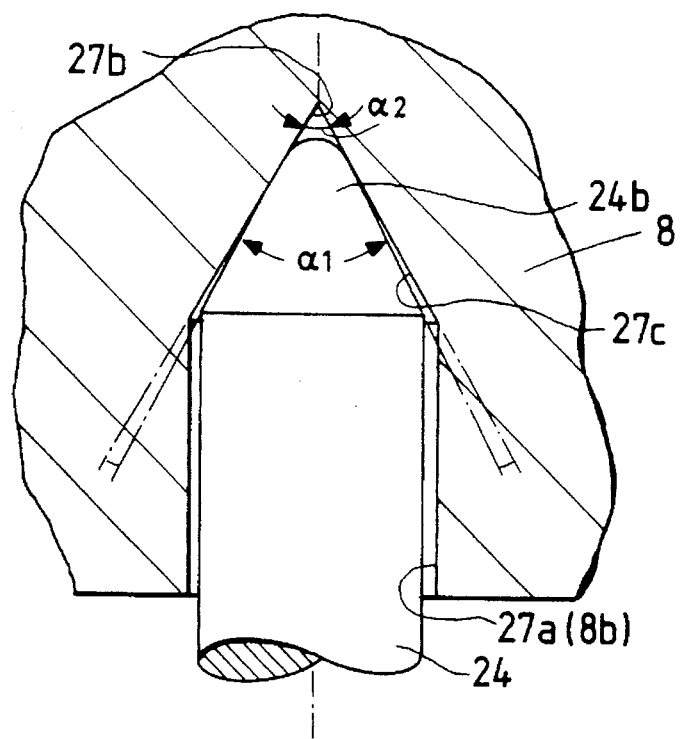
FIG. 5 is a enlarged sectional view showing a portion including a shaft and a bearing in the DC motor of the second embodiment.
Figure 6:
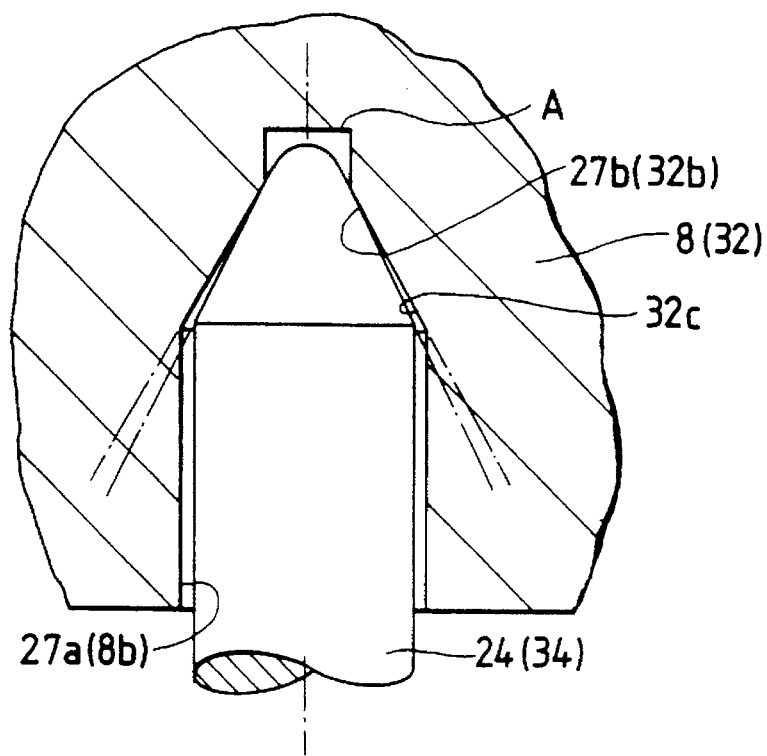
FIG. 6 is a enlarged sectional view showing a modification of the portion including a shaft and a bearing in the DC motor of the embodiment.

The armature 30 is constructed such that a rotor section 3 and a commutator unit 10 are rotatively mounted on the shaft 24. The shaft 24, shaped tubular, consists of two portions of different diameters. The lower portion 24a is smaller in diameter than the other portion (the lower portion 24a of the shaft 24 is closer to the bottom 2a of the stator case 2 and its bottom end is guided into the bearing portion 6). The distal end part 24b (of the other portion of the shaft 4 located closer to the cover 5) is shaped conical, as shown in FIGS. 5 and 6. The apex of the conical, distal end part 24b is spherical in shape. Oblique lines of both sides of the conical end part 24b when viewed in cross section intersect at an angle α1.

The bottom end of the lower portion 24a of the shaft 24 is press fit into the hole 6a of the bearing portion 6, thereby to be fixed to the first stator case 2.

A plurality of silicone steel plates with excellent magnetic characteristics are laminated into the rotor core 7. The shape of the rotor core 7 is the same as that of the rotor core in the first embodiment. Hence, no further description of the rotor core will be given.

A commutator holder 8 with a flange 8c is inserted into a hole 7a formed in the central part of the rotor core 7. The commutator holder 8 for supporting the commutator 9 is fit into the commutator 9. A hole 8b having the bottom of the boss is formed in the bottom end 8a of the commutator holder 8, which is provided with a hole 27 serving as a bearing portion for supporting the support shaft 24. The top end of the commutator holder 8 is shaped into a conical 8c. The commutator 9, which consists of conical members of which the vertices lie on the axial line of the shaft 24, is fixed to the conical part 8c of the commutator holder 8. The commutator 9 is for changing the direction of the current flowing through the winding 15. A pair of brushes 16, which are connected to a power source, not shown, are brought into contact with the surface 9a of the commutator 9.

Three electrode terminals 17, which extend radially from the commutator holder 8 in three directions, are arranged around the commutator 9. Each of the terminals 17 is connected to the winding 15, which consists of the predetermined of number of turns of wires on the rotor core 7.

The cross section of the hole 27 is as illustrated in FIG. 5. The diameter of the lower part 27a (the hole 8b having the bottom of the boss) of the hole 27 is slightly larger than that of the shaft 24. The hole 27 of which the upper part 27b is conically shaped, has a tapered side wall 27c. In the cross section of the hole 27, two oblique lines of the side wall 27c intersect at an angle $\alpha 2$ on the axial line of the shaft 14.

The conical angle $\alpha 2$ is slightly larger than the conical angle $\alpha 1$ of the conical end part 24b of the shaft 24, to produce a difference ($\alpha 2 - \alpha 1$). A boss 28a of a gear 28 made of insulating material is press fit into the hole 8b having the bottom of the boss of the commutator holder 8, as shown in FIG. 4. The gear 28 is rotatively supported by the shaft 24.

Thus, the gear 28, the commutator holder 8 and the rotor core 7 are assembled into a single unit assembly. This assembly is rotatively supported by the shaft 24. The winding 15 is placed on the the rotor core 7, with an insulating layer 14 interposed therebetween. Arcuate magnets 12 are disposed around the rotor core 7. Each magnet 12 is fastened to the first stator case 2 while a yoke 13 is interposed therebetween.

The stator section 4 is disposed coaxial with the shaft 24 in a state that the magnet 12 is separated from the rotor core 7 by a predetermined air gap d.

As in the first embodiment, the center plane Z of the rotor core 7 as viewed in the direction of the axis of rotation is staggered with respect to the magnetic center plane Z' of the magnet 12 as viewed also in the direction of the axis of rotation, as shown in FIG. 4. In the illustration of FIG. 4, the magnetic center plane Z' is lower than the center plane Z. At the magnetic center plane Z', the maximum gap magnetic flux density is produced.

With this arrangement, the rotor core 7 is constantly biased toward the magnetic center plane Z', i.e., in the direction P of an arrow, by a magnetic force attraction by the magnets 12. As a result, a clearance between the rotary shaft 24 and the commutator holder 8 with the hole 27 serving as the bearing portion is minimized, allowing a smooth rotation of the motor and hence reducing motor noise.

The output shaft 26, through which the rotation force of the DC motor 1 is output, is rotatively supported by the thrust bearing 25 of the stator case 2 and the cover 5 as the second stator case.

An output gear 29 is fastened to the output shaft 26. The output gear 29 is in mesh with the gear 28 fastened to the rotor core 7. Through the output gear 29, the rotation force of the rotor section 3 is transmitted to the output shaft 26.

In the second embodiment, the closed upper part 27a of the hole 27 for supporting the shaft 24 is shaped conically. Alternately, a hollow A may be formed at the apex of the hole 27, as show, in FIG. 6. What is essential is that conical hole has the side wall tapered at the angle $\alpha 2$, which is larger than the angle $\alpha 1$ of the apex of the shaft 24.

The operation of the brush-use DC motor thus constructed will be described.

Upon power on, current flows through the paired brushes 16, the commutator 9 into the winding 15. As a result, the rotor core 7 is magnetized. At this time, the direction and phase of the flowing current are switched by the commutator 9, so that the polarities of the magnetic poles formed vary. The rotor section 3 repels the magnetic field developed by the magnet 12 thereby to turn.

The magnetic attraction force by the magnet 12 acts on the rotor section 3 to press the rotor section 3 in the direction P of an arrow or downward in the stator case 2. The rotor section 3 rotates in a state that the tapered side wall 27c of the hole 27 is pressed against the conical surface of the distal end part 24b of the shaft 24. With the rotation of the rotor section 3, the output shaft 26 is rotated through the gear 28 and the output gear 29.

As stated above, the angle $\alpha 2$ of the tapered side wall 27c of the hole 27 is slightly larger than the angle $\alpha 1$ of the distal end part 24b of the shaft 24. Therefore, the tapered side wall 27c contacts with the conical surface of the distal end part 24b linearly, not aerially when the former is pressed against the latter by the magnetic force.

With such a structure, a play of the rotor section 3 in the radial direction is reduced. Since the shaft 24 linearly contacts with the hole 27, the frictional resistance of rotation is reduced.

Another construction of the second embodiment resides in that the hole 27 as a bearing is formed in the commutator holder 8. Because of this, the DC motor can be flattened when comparing with the conventional DC motor in which the bearings are formed at the upper and lower locations of the stator case 2.

THIRD EMBODIMENT

Figure 7:
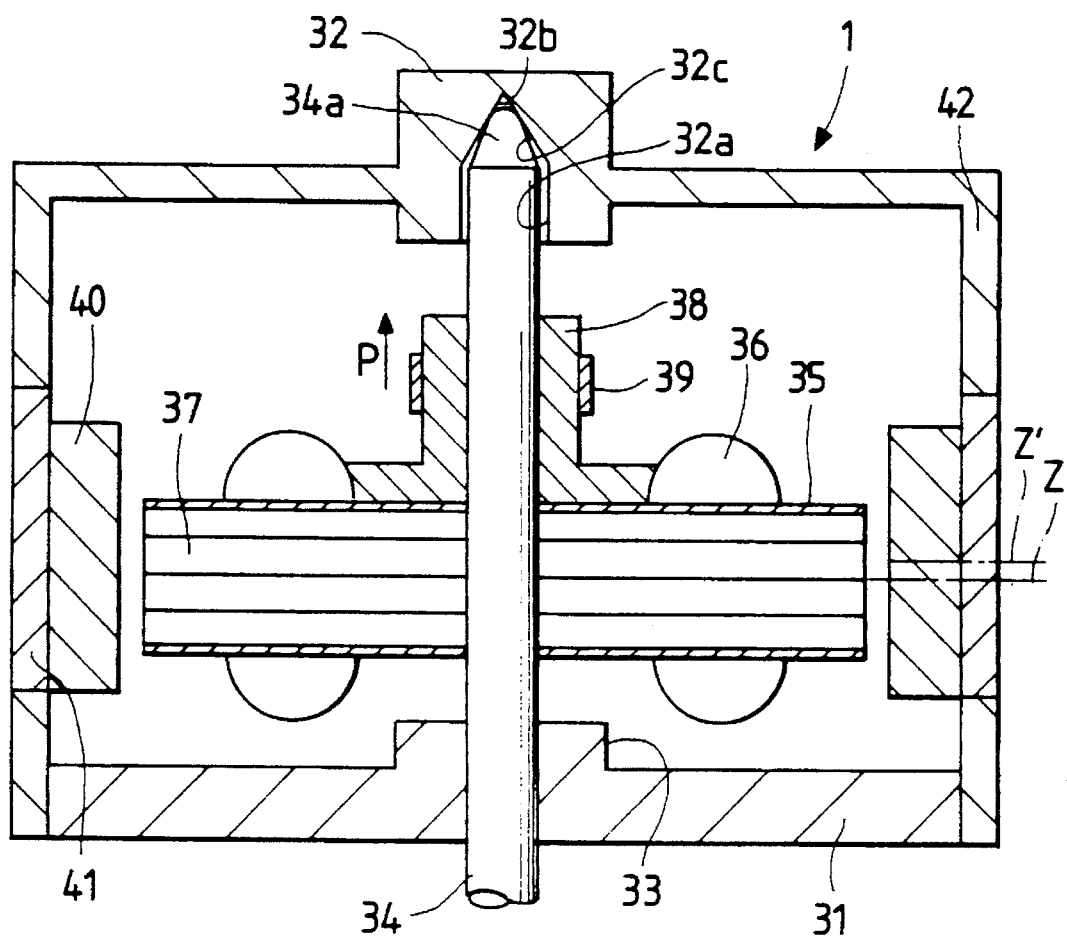
FIG. 7 is a sectional side elevation view of a small brush-use DC motor according to a third embodiment of the present invention.

FIG. 7 is a third embodiment of the present invention.

In the third embodiment like the first embodiment, a small brush-use DC motor of the type in which the shaft is rotatable, is handled. The third embodiment is different from the first embodiment in that a bearing for supporting the rotary shaft is formed in the cover as the second stator case.

In FIG. 7, first and second bearing portions 32 and 33 are respectively formed in a first stator case 30 and a cover 31 as a second stator case. A rotary shaft 34 is rotatively supported by the first and second bearing portions 32 and 33.

A concavity 32a is formed in the first bearing portion 32. The shape of the concavity 32a is shaped like that of the second embodiment.

The cross section of the hole 32 is as illustrated in FIG. 6. The diameter of the lower part 32a of the hole 32 is slightly larger than that of the shaft 34. The hole 32 of which the upper part 32b is conically shaped, has a tapered side wall 32c. In the cross section of the hole 32, two oblique lines of the side wall 32c intersect at an angle α2 on the axial line of the shaft 34.

As shown in FIG. 6, the angle α2 (FIG. 5) is somewhat larger than the angle α1 of the conical lower portion 24a of the shaft 24 so as to produce a difference (α2–α1).

A winding 36 is wound on a rotor core 37 while an insulating layer 35 is interlayered between them. A tubular commutator 38 is fastened to the upper part of the rotor core 37. A brush 39 is brought into press contact with the tubular commutator 38.

A magnet 40 is fastened to a first stator case 42, with a yoke 41 intervening therebetween. The magnet 40 is coaxial with the rotary shaft 34 around the rotor core 37.

In the thus constructed support structure for the rotary shaft, when the rotor core 37 rotates, the rotary shaft 34 rotates together therewith.

The rotary shaft 34 rotates in a state that, as in the second embodiment, one end 34a of the rotary shaft 34 is brought into press contact with the lower part 32a of the first bearing portion 32 by the magnetic force developed by the magnet 40. Thus, the rotary shaft 34 rotates in a state that it linearly contacts with the first bearing portion. A play of it in the radial direction is reduced.

As seen from the foregoing description, in the DC motors of the first to third embodiments, the clearance between the shaft and the bearing is reduced to a minimum. And those contact with each other linearly. The armature can be turned smoothly, and the motor noise is reduced.

With the conical shape of the commutator, the space of the motor assembly can be reduced in the axial direction when compared with the conventional one. The result is to reduce noise, to be flattened in shape, and to provide an easy assembling work.

FOURTH EMBODIMENT

An embodiment of the present invention in which the DC motor of each of the first to third embodiment is applied to a music box.

In the music box, called a motor-driven music box, the small DC motor constructed as described above, is used to drive a rotary drum for striking vibrating plates by way of a reduction gear train.

Figure 8:
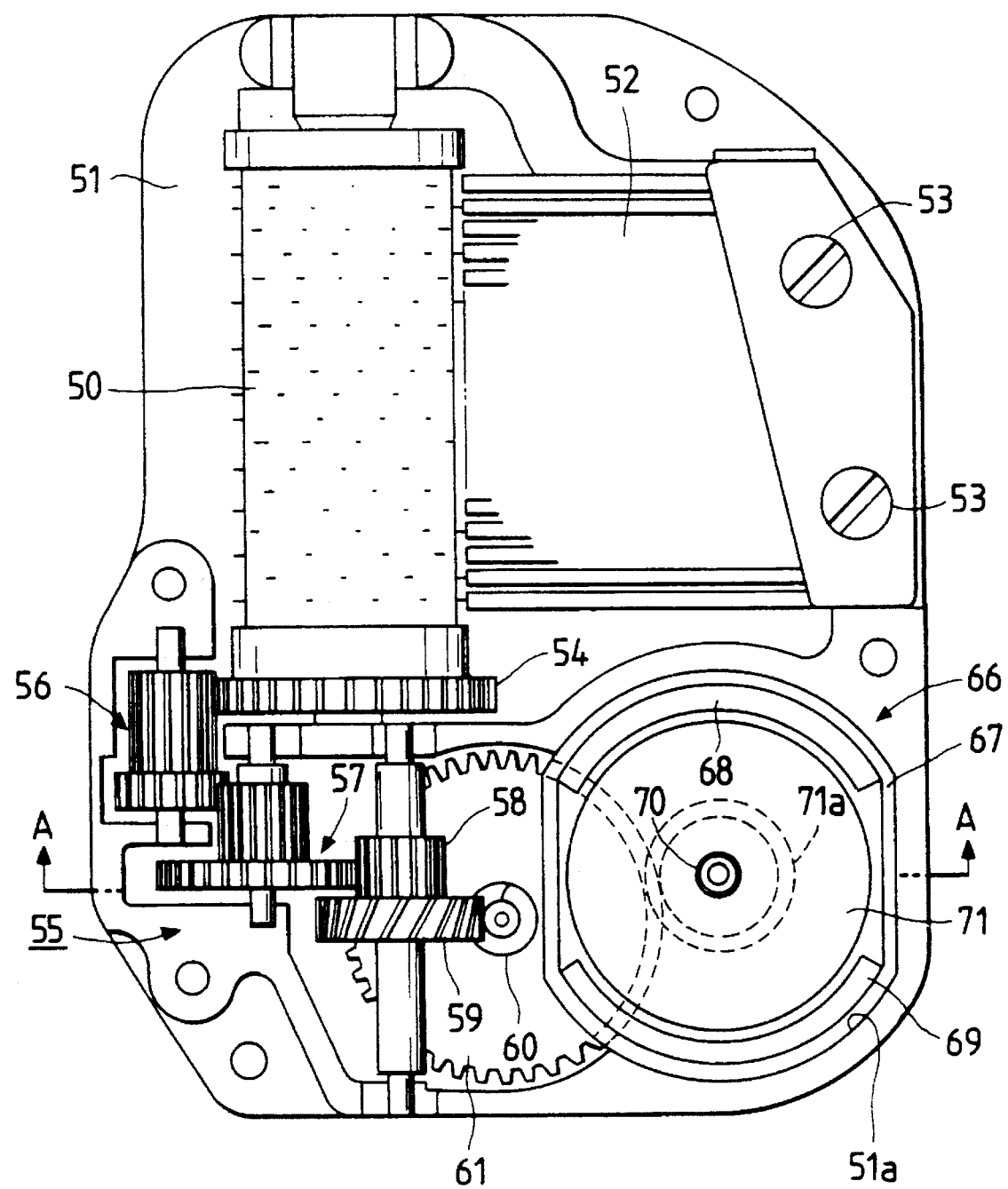
FIG. 8 is a plan view showing a motor-driven music box according to the fourth embodiment of the present invention.
Figure 9:
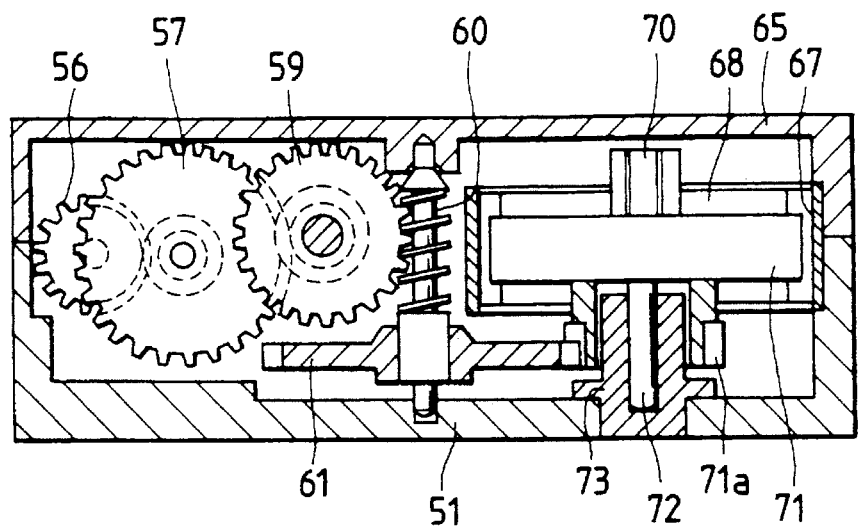
FIG. 9 is a cross sectional view taken on line A—A in FIG. 8.

In FIG. 8, reference numeral 50 designates a well rotary drum rotatively supported at both ends thereof by a frame 51. A number of tuned vibrating plates 52, arranged side by side, are fastened to the frame 51 by means of screws. The rotary drum 50 stands in front of the vibrating plate 52. A number of pegs or pins in the surface of the rotary drum 50 strike the tips of the vibrating plates 52 to produce music.

A drum gear 54 is fixed to the bottom end (as viewed in the drawing) of the rotary drum 50. The drum gear 54 meshes with a final gear 56 of a reduction gear train 55.

The reduction gear train 55 consists of a gear 57, a gear 58, a worm gear 59 integral with the gear 58, a worm 60, and a gear 61 integral with the worm 60. The gear 61 is in mesh with a motor gear 71a of an armature 71 of a small brush-use DC motor 66.

Figure 10:
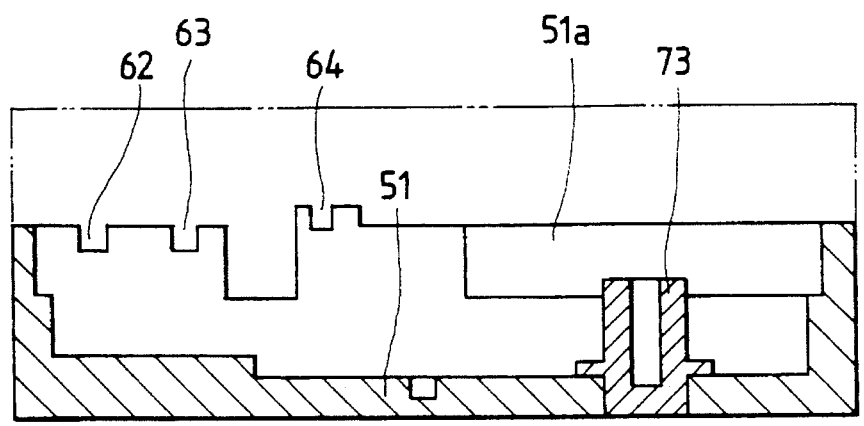
FIG. 10 is a cross sectional view showing only the frame of the music box.
Figure 14:
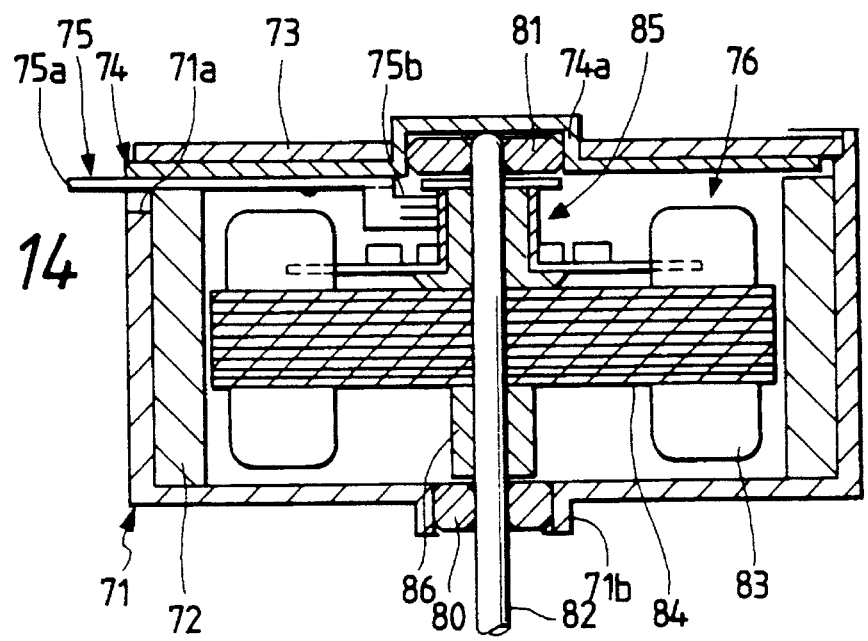
FIG. 14 is a sectional side elevation view of a conventional small brush-use DC motor.

The gears 56, 57, 58, and 59 are supported at both ends thereof in bearing indents 62, 63 and 64 which are opened upward (FIG. 10). The gears 56, 57, 58, and 59 may be assembled by merely putting down those gears into those upward open bearing indents of the frame 51. The worm 60 is supported at one end by the frame 51 and at the other end by a cover 65, which serves as a second stator case. The small brush-use DC motor 66 is located at the lower right corner (as viewed in the drawing) of the frame 51 (FIG. 8).

The DC motor 66 is composed of a yoke 67, a pair of magnets 68 and 69 supported by the yoke 67, the armature 71 with a commutator 70, and a brush (not shown) coming in contact with the commutator 70. The yoke 67 is set in a recess 51a (FIGS. 8 and 10) of the frame 51 in such a state that about ⅔ of the circumferential side of the yoke 67 is surrounded by the recess.

Although not shown, the base of the brush of the DC motor 66 is fastened to the cover 65. The armature 71 is supported by the frame 51 such that a shaft 72 (rotatable in the fourth embodiment) of the armature 71, which is to be orthogonal to the frame 51, is put down into a tubular bearing 73 of the frame 51, as the reduction gear train 55.

In assembling the DC motor 66, the yoke 67 having magnets 68 and 69 fastened to the inner side of the yoke is put down into the recess 51a of the frame 51. Then, the shaft 72 of the commutator 70 is merely put into the bearing 73. Finally, the cover 65 with the brush is applied to the frame 51 so that the brush comes in contact with the commutator 70.

In the embodiment illustrated, the tubular bearing 73 is provided separately from the frame 51, but it may be formed integral with the frame 51.

FIFTH EMBODIMENT

Figure 11A:
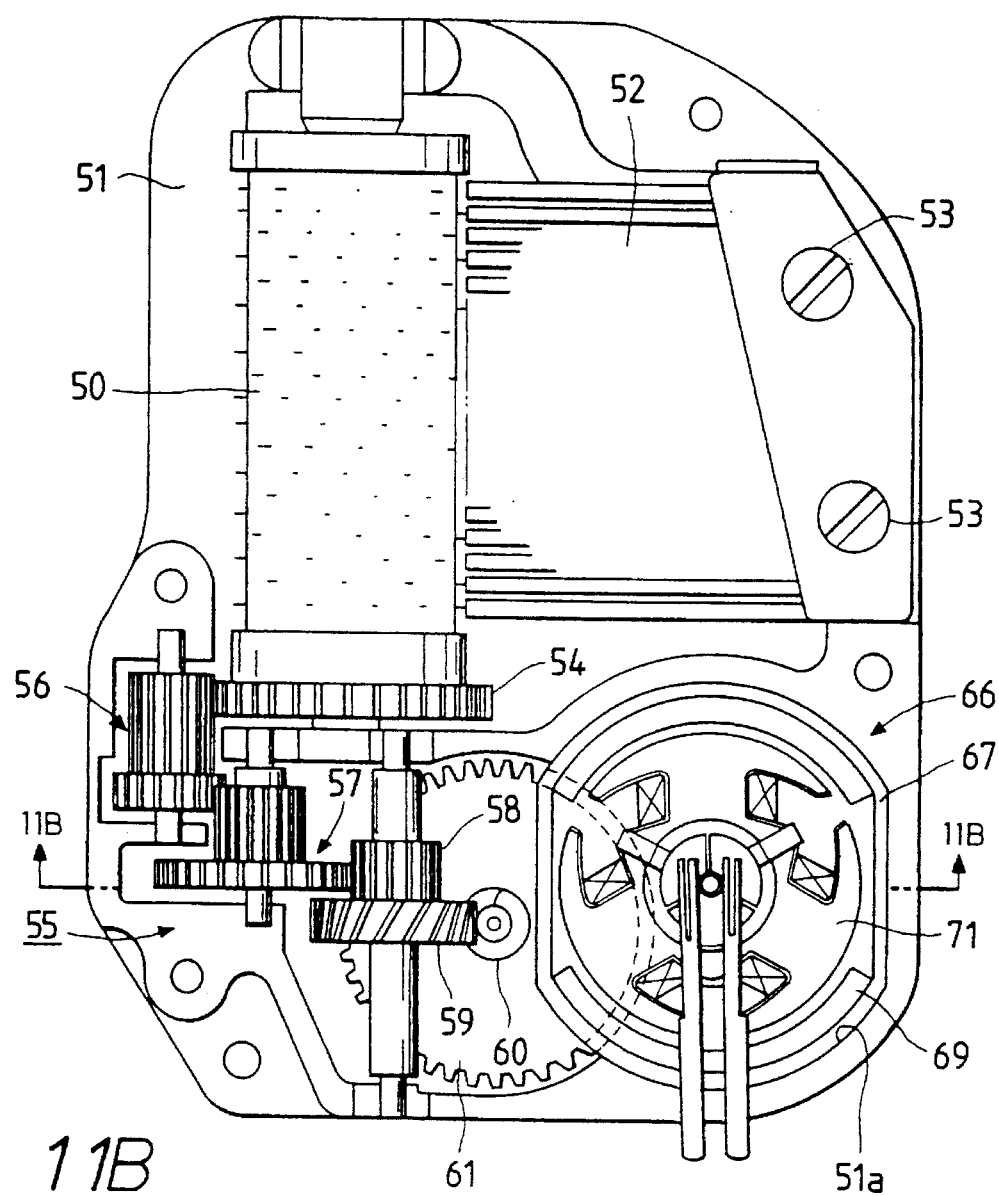
FIGS. 11A and 11B are plan and cross sectional views of a music box according to a fifth embodiment of the present invention.
Figure 11B:
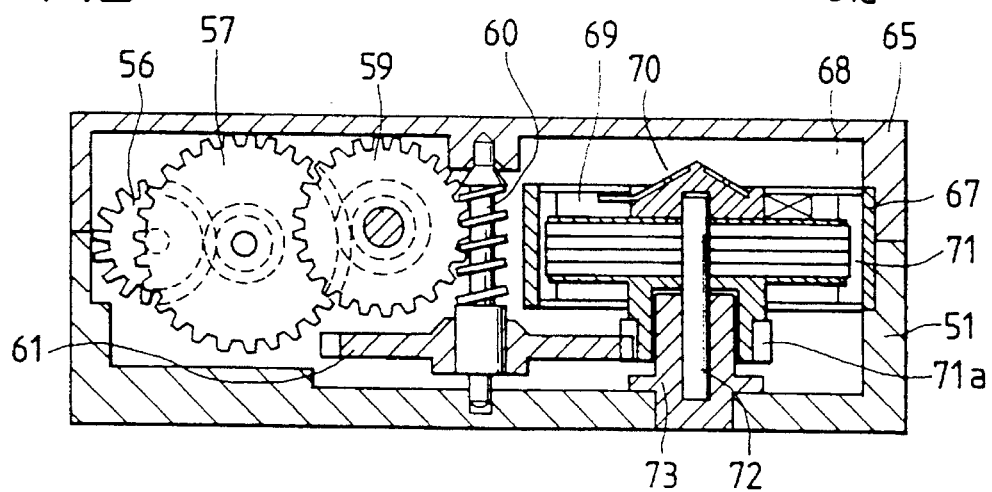

A music box according to a fifth embodiment of the present invention is illustrated in FIGS. 11A and 11B.

The construction of the music box of the fifth embodiment is substantially the same as that of the music box of the fourth embodiment except that the commutator unit of the conical structure is employed in the small brush-use DC motor. This type of the commutator unit is as described in detail in the first embodiment.

SIXTH EMBODIMENT

Figure 12A:
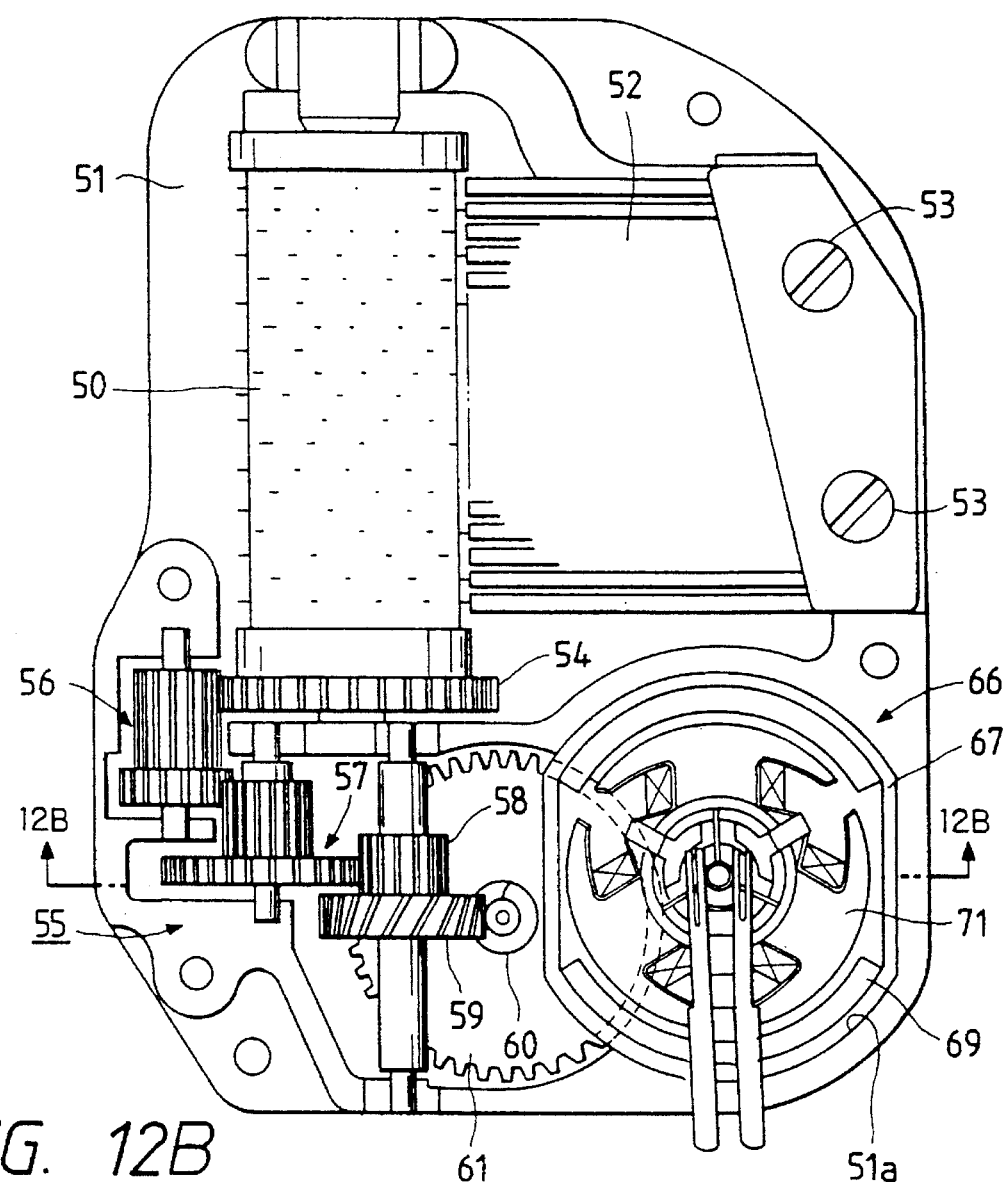
FIGS. 12A and 12B are plan and cross sectional views of a music box according to a sixth embodiment of the present invention.
Figure 12B:
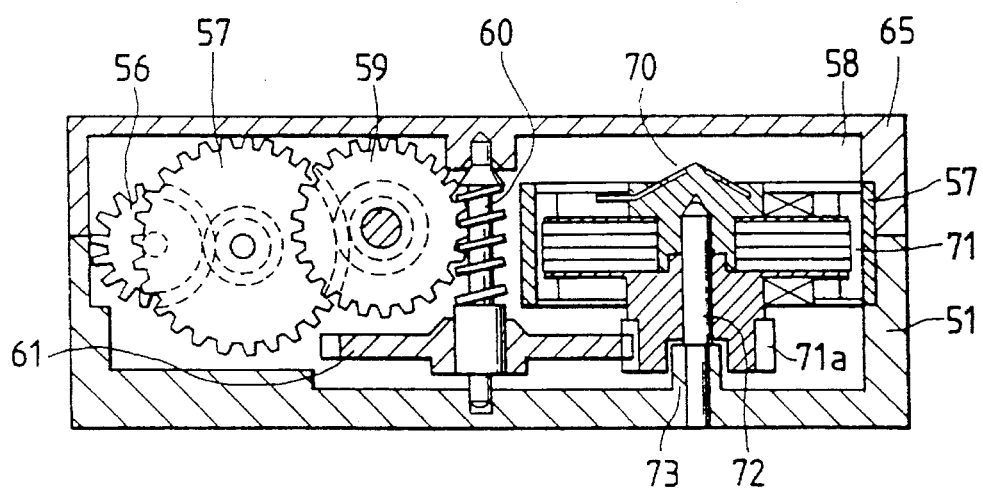

A music box according to a sixth embodiment of the present invention is illustrated in FIGS. 12A and 12B.

The construction of the music box of the sixth embodiment is substantially the same as that of the music box of the fourth embodiment except that the commutator unit of the conical structure is employed in the small brush-use DC motor, and the shaft for supporting the commutator unit is also shaped conical. This type of the commutator unit is as described in detail in the second embodiment.

SEVENTH EMBODIMENT

Figure 13A:
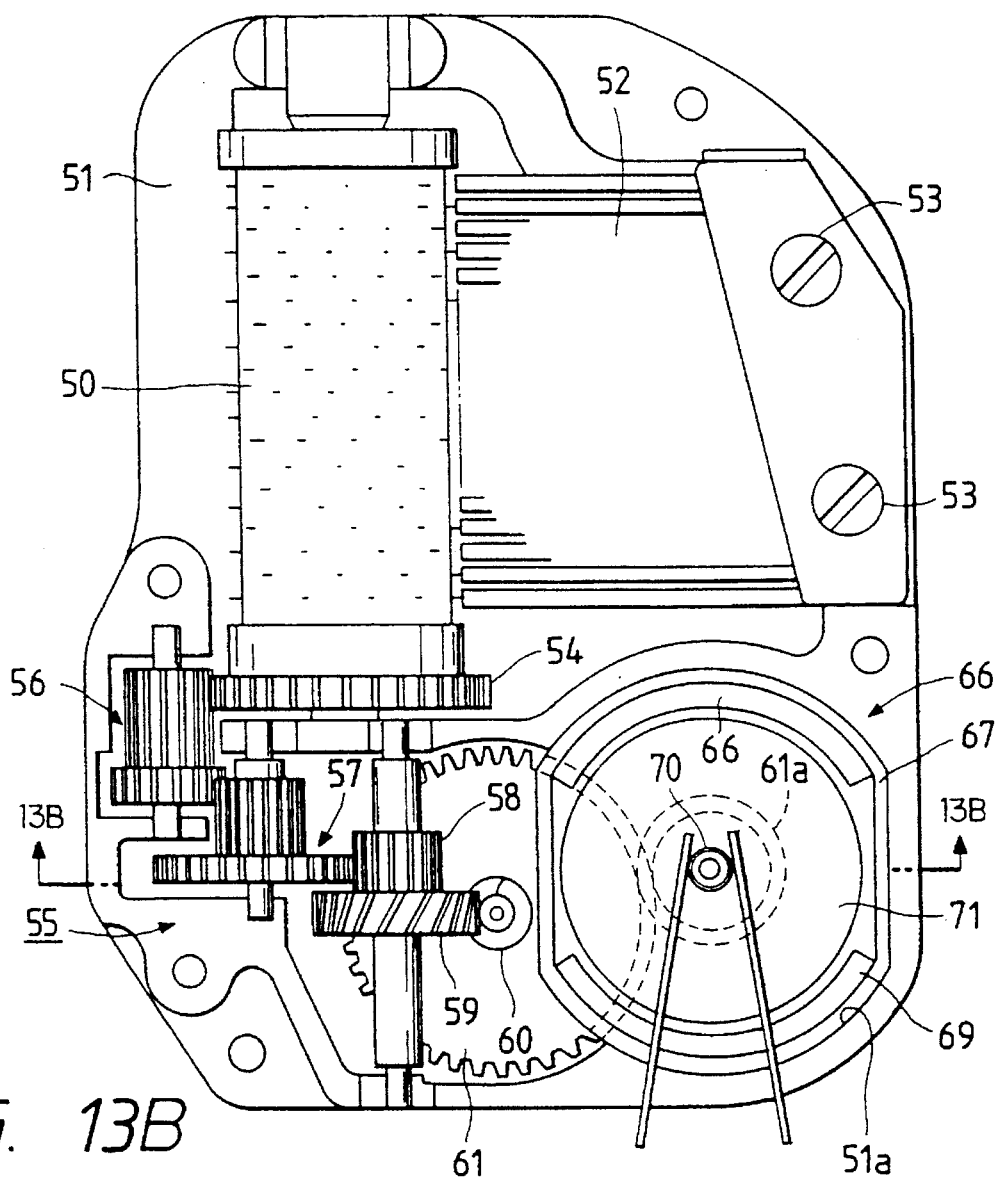
FIGS. 13A and 13B are plan and cross sectional views of a music box according to a seventh embodiment of the present invention.
Figure 13B:
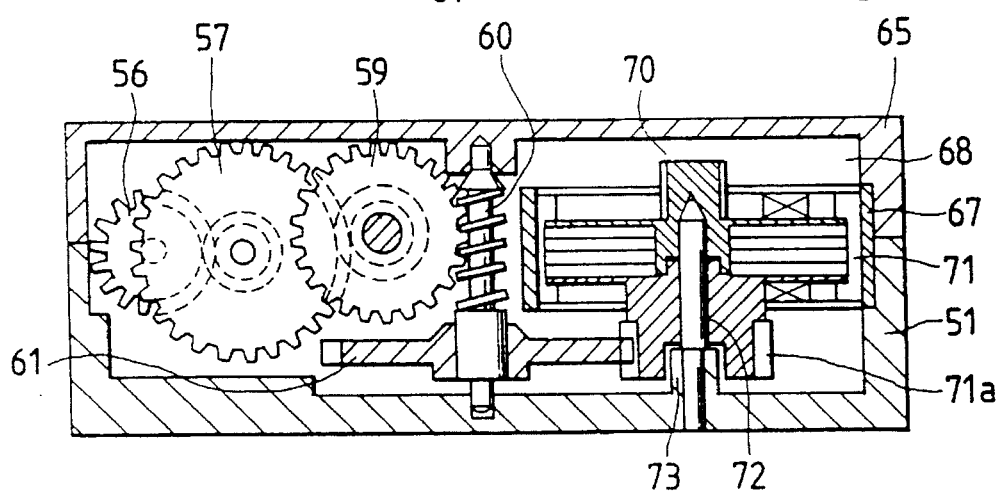

A music box according to a seventh embodiment of the present invention is illustrated in FIGS. 13A and 13B.

The construction of the music box of the seventh embodiment is substantially the same as that of the music box of the fourth embodiment except that the commutator unit of the tubular structure is employed in the small brush-use DC motor, and the shaft for supporting the commutator unit is shaped conical. This type of the commutator unit is as described in detail in the third embodiment.

As seen from the foregoing description, the music boxes of the fourth to seventh embodiments employ the small brush-use DC motors of the first to third embodiments. Those DC motors as the drive sources for the rotary drums are each mounted on the frame as referred to in the fourth embodiment. The shafts of the DC motors are disposed orthogonal to the frames. Therefore, the DC motors can be readily assembled by merely putting the shafts into the bearing indentations of the frames. Therefore, there is eliminated the conventional complicated assembling work of fastening the motor base plate to the frame by means of screws. This facilitates the automatic assembling work of music boxes.

It is evident that the present invention is not limited to the small brush-use DC motors of the first to third embodiments and the music boxes of the fourth to seventh embodiments.

What is claimed is:

1. A small brush-use DC motor comprising:
   a stator member including a first stator case in which a magnet is disposed;
   a rotor member including a rotor core on which a coil is wound, a magnetic center of the rotor core being staggered with respect to the magnetic center of the magnet;
   a commutator unit having a commutator on a conical portion thereof, the commutator rotating together with the rotor member; and
   brushes held by a second stator case in such a manner that the brushes are brought into contact with the commutator under a predetermined pressure,
   wherein an urged direction of the rotor core by a magnetic attraction force of the magnet is the same as a direction in which the predetermined pressure is applied when the brushes are brought into contact with the commutator, said urged direction being away from the brushes.

2. The small brush-use DC motor as claimed in claim 1 further comprising:
   a bearing member for supporting and guiding a shaft for supporting the rotor member, the bearing member being provided in the commutator unit.

3. A small brush-use DC motor comprising:
   a stator member including a first stator case in which a magnet is disposed;
   a rotor member including a rotor core on which a coil is wound, a magnetic center of the rotor core being staggered with respect to the magnetic center of the magnet;
   a commutator unit having a commutator on a conical portion thereof, the commutator rotating together with the rotor member;
   brushes held by a second stator case in such a manner that the brushes are brought into contact with the commutator under a predetermined pressure;
   a fixed support shaft for rotatively supporting the rotor member and the commutator unit, one end of the fixed support shaft having a substantially conical shape; and
   a bearing member formed in the commutator unit and having a tapered portion for being supported on said one end of the fixed support shaft, the tapered portion having a substantially conical shape.

4. The small brush-use DC motor as claimed in claim 3, wherein a conical angle α1 defined at the conical portion of the support shaft is smaller than a conical angle α2 defined at the conical bearing portion.

5. The small brush-use DC motor as claimed in claim 3, wherein an urged direction of the rotor core by a magnetic attraction force of the magnet is the same as a direction in which the predetermined pressure is applied when the brushes are brought into contact with the commutator.

6. The small brush-use DC motor as claimed in claim 3, wherein an urged direction of the rotor core by a magnetic attraction force of the magnet is in the same direction as for pushing the conical portion of the supporting shaft by the tapered portion of the bearing portion.

7. A small brush-use DC motor comprising:
   a stator member including a first stator case in which a magnet is disposed;
   a rotor member including a rotor core winding a coil, the rotor core having the magnetic center being staggered with respect to the magnetic center of the magnet;
   a commutator unit having a commutator being provided on a tubular portion, the commutator rotating together with the rotor member;
   brushes brought into contact with the commutator under a predetermined pressure;
   a rotary shaft for holding the rotor member and the commutator unit so as to rotate together with the rotor member and the commutator unit, one end of the rotary shaft being shaped conical;
   a bearing member having a tapered portion for supporting said one end of the support shaft, the tapered portion having a substantially conical shape; and
   a second stator case in which the bearing member is mounted,
   wherein an urged direction of the rotor core by a magnetic attraction force of the magnet is in the same direction as for pushing the tapered portion of the bearing portion by the conical portion of the rotary shaft.

8. The small brush-use DC motor as claimed in claim 7, wherein a conical angle α1 defined at the conical portion of the rotary shaft is smaller than a conical angle α2 defined at the conical bearing portion.

9. A music device comprising:
   a rotary drum having a plurality of pins arranged in the surface thereof in accordance with a music piece;
   a plurality of vibrating plates sounded by the pins of the rotary drum;
   a small brush-use DC motor for driving the rotary drum through a reduction gear train; and
   a frame for supporting the rotary drum, the vibrating plates, the reduction gear train, and the small brush-use DC motor, the small brush-use DC motor being supported by the frame in such a manner that a stationary shaft for supporting a rotor member of the small brush-use DC motor and a commutator unit is orthogonal to the frame to support the small brush-use DC motor,
   wherein one end of the stationary shaft is fixed onto the frame and an opposite end of the stationary shaft supports the rotor member such that the rotor member is freely rotatable with respect to the stationary shaft.

10. The music device as claimed in claim 9, the small brush-use DC motor includes:
    a stator member including a first stator case in which a magnet is disposed;
    a rotor member including a rotor core on which a coil is wound, a magnetic center of the rotor core being staggered with respect to the magnetic center of the magnet;
    a commutator unit having a commutator being provided on a conical portion, the commutator rotating together with the rotor member; and
    brushes held by a second stator case in such a manner that the brushes are brought into contact with the commutator under a predetermined pressure.

11. The music device as claimed in claim 10, further comprising:

a bearing member for supporting and guiding a shaft for supporting the rotor section, the bearing member being provided in the commutator unit.

12. The music device as claimed in claim 10, wherein an urged direction of the rotor core by a magnetic attraction force of the magnet is the same as a direction in which the predetermined pressure is applied when the brushes are brought into contact with the commutator.

13. A music device comprising:

a rotary drum having a plurality of pins arranged in the surface thereof in accordance with a music piece;

a plurality of vibrating plates sounded by the pins of the rotary drum;

a small brush-use DC motor for driving the rotary drum through a reduction gear train; and a frame for supporting the rotary drum, the vibrating plates, the reduction gear train, and the small brush-use DC motor, wherein the small brush-use DC motor includes:

a stator member including a first stator case in which a magnet is disposed;

a rotor member including a rotor core on which a coil is wound, a magnetic center of the rotor core being staggered with respect to the magnetic center of the magnet;

a commutator unit having a commutator on a conical portion, the commutator rotating together with the rotor member;

brushes held by a second stator case in such a manner that the brushes are brought into contact with the commutator under a predetermined pressure;

a fixed support shaft for rotatively supporting the rotor member and the commutator unit, one end of the fixed support shaft having a substantially conical shape; and a bearing member formed in the commutator unit and having a tapered portion for being supported on said one end of the fixed support shaft, the tapered portion having a substantially conical shape, the small brush-use DC motor being supported by the frame in such a manner that said fixed support shaft is orthogonal to the frame to support the small brush-use DC motor.

14. The music device as claimed in claim 13, wherein a conical angle $\alpha1$ defined at the conical portion of the support shaft is smaller than a conical angle $\alpha2$ defined at the conical bearing portion.

15. The music device as claimed in claim 13, wherein an urged direction of the rotor core by a magnetic attraction force of the magnet is the same as a direction in which the predetermined pressure is applied when the brushes are brought into contact with the commutator.

16. The music device as claimed in claim 13, wherein an urged direction of the rotor core by a magnetic attraction force of the magnet is in the same direction as for pushing the conical portion of the support shaft by the tapered portion of the bearing portion.

17. A music device comprising:

a rotary drum having a plurality of pins arranged in the surface thereof in accordance with a music piece;

a plurality of vibrating plates sounded by the pins of the rotary drum;

a small brush-use DC motor for driving the rotary drum through a reduction gear train; and a frame for supporting the rotary drum, the vibrating plates, the reduction gear train, and the small brush-use DC motor, the small brush-use DC motor including:

a stator member including a first stator case in which a magnet is disposed;

a rotor member including a rotor core winding a coil, the rotor core having the magnetic center being staggered with respect to the magnetic center of the magnet;

a commutator unit having a commutator being provided on a tubular portion, the commutator rotating together with the rotor member;

brushes brought into contact with the commutator under a predetermined pressure;

a rotary shaft for holding the rotor member and the commutator unit so as to rotate together with the rotor member and the commutator unit, one end of the rotary shaft being shaped conical;

a bearing member having a tapered portion for supporting said one end of the support shaft, the tapered portion having a substantially conical shape; and a second stator case in which the bearing member is mounted, the small brush-use DC motor being supported by the frame in such a manner that said rotary shaft is orthogonal to the frame to support the small brush-use DC motor, wherein an urged direction of the rotor core by a magnetic attraction force of the magnet is in the same direction as for pushing the tapered portion of the bearing portion by the conical portion of the rotary shaft.

18. The music device as claimed in claim 17, wherein an urged direction of the rotor core by a magnetic attraction force of the magnet is in the same direction as for pushing the tapered portion of the bearing portion by the conical portion of the rotary shaft.

19. The music device as claimed in claim 17, wherein a conical angle $\alpha1$ defined at the conical portion of the rotary shaft is smaller than a conical angle $\alpha2$ defined at the conical bearing portion.

20. A small brush-use DC motor comprising:

a stator member including a first stator case in which a magnet is disposed;

a rotor member including a rotor core on which a coil is wound, a magnetic center of the rotor core being staggered with respect to the magnetic center of the magnet;

a commutator unit having a commutator on a conical portion thereof, the commutator rotating together with the rotor member;

brushes held by a second stator case in such a manner that the brushes are brought into contact with the commutator under a predetermined pressure; and a bearing member for supporting and guiding a shaft for supporting the rotor member, the bearing member being provided in the commutator unit.

21. A music device comprising:

a rotary drum having a plurality of pins arranged in the surface thereof in accordance with a music piece;

a plurality of vibrating plates sounded by the pins of the rotary drum;

a small brush-use DC motor for driving the rotary drum through a reduction gear train; and a frame for supporting the rotary drum, the vibrating plates, the reduction gear train, and the small brush-use DC motor, wherein the small brush-use DC motor includes:

a stator member including a first stator case in which a magnet is disposed;

a rotor member including a rotor core on which a coil is wound, a magnetic center of the rotor core being staggered with respect to the magnetic center of the magnet;

a commutator unit having a commutator being provided on a conical portion, the commutator rotating together with the rotor member;

brushes held by a second stator case in such a manner that the brushes are brought into contact with the commutator under a predetermined pressure;

a shaft for supporting the rotor member; and a bearing member for supporting and guiding the shaft, the bearing member being provided in the commutator unit, the small brush-use DC motor being supported by the frame in such a manner that the shaft for supporting the rotor member is orthogonal to the frame to support the small brush-use DC motor.

* * * * *